April 15, 1958

J. PINSKY ET AL 2,830,721

PLASTIC COATED ARTICLES

Filed March 28, 1956

INVENTORS
JULES PINSKY,
ALBERT E. ADAKONIS
and ALVIN R. NIELSEN
BY
Burns, Doane, Benedict & Irons
ATTORNEYS United States Patent Office 2,830,721
Patented Apr. 15, 1958

2,830,721

PLASTIC COATED ARTICLES

Jules Pinsky, West Hartford, Albert E. Adakonis, East Hartford, and Alvin R. Nielsen, Hartford, Conn., assignors to Plax Corporation, Bloomfield, Conn., a corporation of Delaware Application March 28, 1956, Serial No. 574,383

15 Claims. (Cl. 215—1)

This invention relates generally to synthetic resin articles and more particularly to synthetic resin articles, such as sheets, bottles and containers, which have enhanced resistance to permeation by fluids. More specifically, the invention is directed to plastic articles, such as polyethylene containers and bottles, a surface of which is modified by application of an adherent coating thereto to prevent or reduce the rate of permeation of the synthetic resin material by many of the commonly encountered fluids, particularly organic liquids.

Synthetic resin containers and bottles as, for example, polyethylene bottles, have become widely popular as a packaging means for various liquids such as deodorants, hair preparations, cosmetic preparations, medicinal preparations, and the like. In particular, polyethylene has been and is widely used in the production of squeeze bottles for the distribution of such preparations in that it is relatively inert, has the necessary flexibility to function as a squeeze bottle, and can be easily fabricated in quantity at a reasonable cost. Unmodified polyethylene is entirely satisfactory for a wide variety of materials. However, polyethylene and other synthetic resins which are usable as containers are permeable to many organic liquids, including a large number of conventional organic solvents which are widely used in fluid preparations for which the polyethylene bottle or container is highly desirable. Representative chemicals, for example, which permeate with various degrees of rapidity through polyethylene at room temperature, include the straight chain hydrocarbons, the aromatic hydrocarbons, esters, ketones, and various other non-polar fluids. Consequently, because of this high permeability characteristic of polyethylene and other synthetic resin materials from which containers are desirably fabricated, the use of these materials has of necessity been restricted to those products to which the resin is substantially impermeable. The permeable characteristics of polyethylene with respect to certain of these chemicals has resulted in polyethylene bottles being rejected for use in applications where, due to its flexibility and ease of fabrication, it might otherwise be employed to greater advantage.

It has previously been suggested that polyethylene bottles be lined with such materials as polyvinyl alcohol, polyvinyl chloride and copolymers of polyvinyl chloride and polyvinyl acetate to obtain an oil resistant film which will resist permeation by oily materials. While such liners have been moderately successful, there is currently no known liner material which will form an adherent coating on a polyethylene surface and which will resist permeation by a wide variety of organic fluids such as toluene, hexane, carbon tetrachloride, ethyl acetate, and the like.

In view of the problems as above set forth relating to the use of synthetic resin containers and bottles, particularly those produced from polyethylene, it is a primary object of this invention to provide a plastic article which is characterized by enhanced resistance to permeation by a variety of fluids.

It is another object of this invention to provide a container or bottle formed from a synthetic resin, a surface of which carries an adherent coating which will prevent permeation of the resinous container structure by a variety of commonly employed organic fluids.

It is an additional object of this invention to provide a polyethylene bottle having an adherent resinous coating on the interior and/or exterior surface thereof which is characterized by substantial freedom from permeation by a variety of organic fluids, particularly the common hydrocarbon solvents.

It is a more specific object of the present invention to provide a polyethylene bottle having an adherent synthetic resin coating which is substantially impermeable to many organic fluids capable of substantially permeating the polyethylene bottle walls in the absence of such coating.

Generally described, the present invention comprises a plastic article having a surface characterized by enhanced resistance to permeation by fluids comprising a plastic surface having an adherent coating of a cured epoxy resin. In its more specific embodiments, the invention comprises a synthetic resinous container, a surface of which has an adherent coating of a cured epoxy resin. In its most preferred embodiment, the invention comprises a polyethylene bottle, the interior surface of which has an adherent coating of a cured epoxy resin.

An epoxy resin may be broadly defined as the complex polymeric reaction product of polyhydric phenols with poly-functional halohydrins. Usually the halohydrin is employed in proportions in excess of that equivalent to the polyhydric phenol and less than that which is twice the equivalent amount. The reaction is usually carried out in the presence of caustic alkali which is preferably employed in at least the quantity necessary to combine with the halogen liberated from the halohydrin and usually is employed in excess. The resulting products may contain terminal epoxy groups, or terminal epoxy groups and terminal primary hydroxyl groups. The terminal epoxy groups are usually in excess of the terminal primary hydroxyl groups.

Representative polyhydric phenols include resorcinol, hydroquinone, catechol, phloroglucinol, and various bis-phenols resulting from the condensation of phenol with aldehydes and ketones, such as p,p′dihydroxy diphenyl dimethyl methane (bis-phenol, A), p, p′ dihydroxy 1, 1′ dinaphthyl methane, polyhydroxy naphthalenes and anthracenes, o,o′,p,p′ - tetrahydroxy diphenyl dimethyl methane, p-hydroxy phenyl p-hydroxy m-(p-hydroxy phenyl) phenyl dimethyl methane, and the like. Epichlorhydrin is the preferred halohydrin.

The molecular weight of the epoxy resins may be controlled by the relative portions of the reactants as well as by the extent to which the reaction is carried out. Thus it is possible to produce resins varying from a viscous taffy-like material to a hard, horny solid. Moreover, variations of epoxy resins may be obtained by employing substituted polyhydric phenols or polyfunctional halohydrins as starting materials. All of the epoxy resins are soluble in solvents such as acetone, methyl ethyl ketone, methyl isobutyl ketone, diacetone alcohol, cyclohexanone, and the like.

The epoxy resins may be readily hardened or cured to an insoluble, infusible state by further reaction of the epoxy and hydroxyl groups with cross-linking agents including diamines or polyamines such as metaphenylene diamine, diethylene triamine, and the polyethylene polyamines; diisocyanates, such as methylene bis-(4 phenyl) isocyanate; dialdehydes, such as glyoxal; dimercaptans; amides and polyamides, such as those disclosed in U. S. 2,705,223. If desired, the epoxy resin may be modified by reaction with materials such as 2,3-epoxy-1-propanol before adding the hardener. The coatings applied to the synthetic resin surfaces in accordance with this invention are the cured or hardened epoxy resins.

It is often desirable to pretreat the plastic substrate in order to promote enhanced adherence of the coating or lining material. In U. S. Reissue Patent 24,062 to Horton, it is disclosed that improved adherence of polar compounds to polyethylene may be effected by treating the surface to be printed, lined or coated with a solution of sulfuric acid and a dichromate. U. S. Patents 2,715,075, 2,715,076 and 2,715,077 to Wolinski disclose that desired surface modification may be obtained by treatment with ozone, nitrous oxide or mixtures of the two. Suitable surface modification also may be obtained by flame treating the surface to be printed, coated or lined, such as shown in U. S. Patents 2,632,921 and 2,704,382 to Kreidl. All of these treatments involve the oxidation of the plastic surface and, in many instances, the conversion of an initially hydrophobic surface to a hydrophilic surface.

The epoxy resin of the invention is preferably applied to the surface to be lined or coated in an uncured state, dissolved in a suitable solvent such as toluene, methyl ethyl ketone, and the like. The coating may be applied by conventional techniques, such as by spraying, or manually by at least partially filling the bottle followed by suitable manipulative and draining steps to insure the application of an even coating to the interior surface. If the coating is applied to the exterior surface of the article, it need simply be immersed in a bath of the coating material and allowed to drain. Exterior coatings may, of course, be applied by spraying techniques. The cured coating or lining is then produced in situ by subjecting the coated article to a curing temperature for a period of time necessary to produce the desired chemical reaction. Desirably, the coating will be cured at a temperature of 190–220° F. for a period of at least a half hour. Shorter periods of time may obviously be employed with higher curing temperatures. The curing time and temperature will also be varied by the amount and type of catalyst or hardening agent employed. If desired, the lined or coated objects may be allowed to stand for an extended period, e. g., twenty-four to seventy-two hours at room temperature prior to being cured at higher temperature, thus reducing the time required for the advanced temperature curing operation. The softening point of the plastic being coated generally constitutes the upper limit of the curing temperature and for unmodified polyethylene this upper limit is about 220° F.

In the accompanying drawing illustrative embodiments of the invention are presented.

Figure 1:
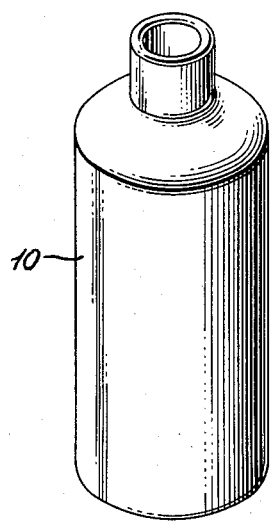
Fig. 1 is an elevational view of a conventional "Boston round" polyethylene bottle 10 which has not been modified in accordance with the invention.
Figure 2:
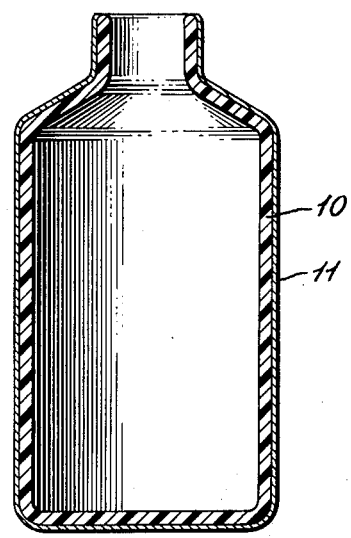
Fig. 2 is a sectional view of a similar polyethylene bottle 10 having a continuous external coating 11 of a cured epoxy resin.
Figure 3:
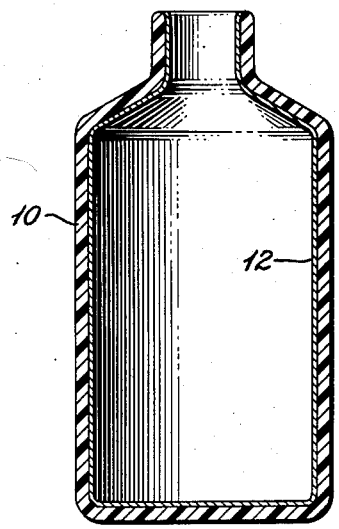
Fig. 3 is a sectional view of a similar polyethylene bottle 10 having a continuous internal lining 12 of a cured epoxy resin.
Figure 4:
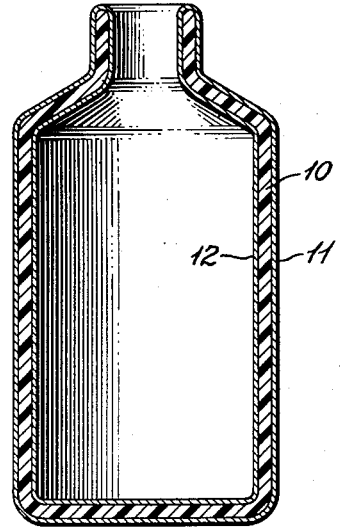

Fig. 4 is a sectional view of a similar polyethylene bottle 10 having both a continuous exterior coating 11 and a continuous interior lining 12 of a cured epoxy resin.

Having generally described the invention, the following examples are presented for purposes of illustrating various embodiments thereof.

Unless otherwise identified, the following uncured epoxy resins were employed in the examples and will be referred to as epoxy resin A, B, C or D.

(A)
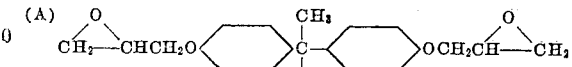
(a reaction product of epichlorhydrin and p, p' dihydroxy diphenyl dimethyl methane)

(B)
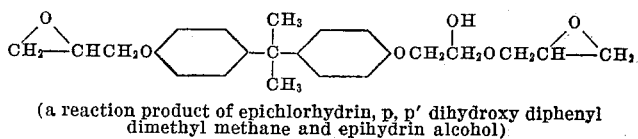
(a reaction product of epichlorhydrin, p, p' dihydroxy diphenyl dimethyl methane and epihydrin alcohol)

(C)(1) 65%
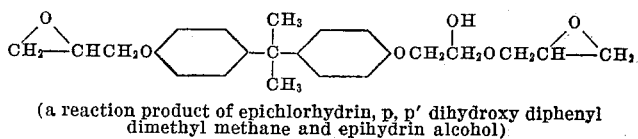

(2) 35%
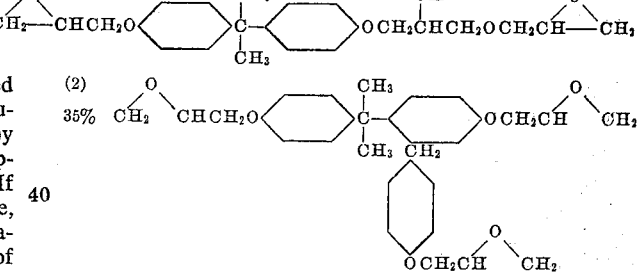
(a reaction product of epichlorhydrin and dimethyl, p-hydroxy phenyl, p-hydroxy-o-(p-hydroxy benzyl) phenyl methane)

(D)
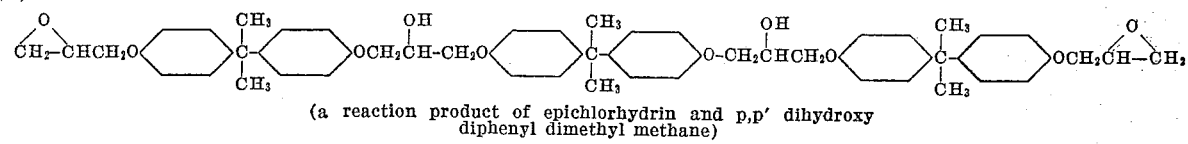
(a reaction product of epichlorhydrin and p,p' dihydroxy diphenyl dimethyl methane)

Unless otherwise identified, the following cross-linking (hardening) agent was employed in the examples and will be referred to as hardener E.

(E)
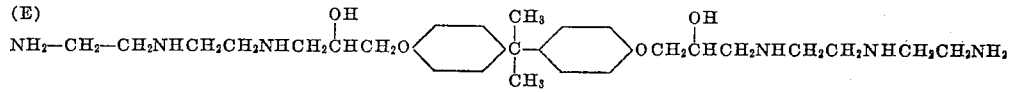

Example 1

Epoxy resin B and hardener E were mixed in a 3:2 ratio and thinned with methyl ethyl ketone to a solids content of 70%. The interior surfaces of four ounce Boston round polyethylene bottles were manually coated with this material. The liners were cured at 160° F. for sixty minutes. A portion of these bottles were recoated and cured for an additional twelve hours. The bottles were then filled with carbon tetrachloride and allowed to stand for eight days at room temperature. The single-lined bottles showed an average per day loss of 0.096 gram, while the double-lined bottle showed an average loss of 0.005 gram per day. Similar uncoated bottles showed a loss of 3.49 grams per day.

Example 2

Epoxy resin B and hardener E were admixed in a 4:1 ratio and thinned with methyl ethyl ketone to produce a coating "X" having a percent solids of 70%. Coating "Y" was prepared by admixing epoxy resin A with hardener E in a 4:1 ratio, and thinned with methyl ethyl ketone to 70% solids. Four ounce Boston round polyethylene bottles were interiorly lined with each of these coating mixtures and cured until an adherent coating was obtained. These bottles were filled with carbon tetrachloride and stored for eight days at room temperature. The bottles coated with the "X" mixture exhibited an average loss per day of from 0.022 to 0.296 gram per day, while the bottles coated with the "Y" mixture exhibited an average loss of 0.014 and 0.039 gram per day. The weights of the liners ranged between 0.616 to 2.445 grams. The uncoated bottles showed a loss of 3.49 grams per day.

Example 3

Four ounce Boston round polyethylene bottles were lined using a 3:1 ratio mixture of epoxy resin A and hardener E thinned with methyl ethyl ketones to 70% solids. The linings were cured at 140° F. for 12–14 hours. The bottles were filled with carbon tetrachloride and stored at 70° F. for thirty-six days. The lined bottles showed a loss of 0.012 to 0.015 gram per day as compared to a loss of 4.4 grams per day for the unlined bottles employed as a control. The liner weights ranged from 1.266 to 1.408 grams.

Example 4

Quart polyethylene bottles were lined with a mixture of epoxy resin A and hardener E admixed in a 3:1 ratio. Weights of the liners ranged from 10–11 grams. After the linings were cured for fourteen hours at 140° F., individual bottles from this group and unlined control bottles were filled with carbon tetrachloride, hexane and toluene. These bottles were stored for 153 days at 70° F. with the following results:

WEIGHT LOSSES IN GRAMS AFTER 153 DAYS AT 70° F.

|  | Lined Bottles | | Control Bottles, Grams Per Day |
|---|---|---|---|
|  | After 153 Days | Grams Per Day |  |
| Carbon Tetrachloride | 32 | 0.21 | 8.0 |
| Hexane | 22 | 0.15 | 5.06 |
| Toluene | 19 | 0.13 | 5.40 |

The test with the bottles containing toluene was continued for a total of 540 days, at which time the bottles showed no signs of collapse.

Example 5

In order to determine the effect of the concentration of the epoxy resin in the coating solution, the resin mixture of Example I was diluted with 25, 50 and 75% of its volume with methyl ethyl ketone. Four ounce Boston round polyethylene bottles were interiorly coated with these coating solutions and the coatings were cured for from 12 to 14 hours at 140° F. Bottles were tested for permeability at room temperature for forty days, with the organic solvents listed in the table below:

WEIGHT LOSSES PER DAY (GRAMS)

|  | 25% | 50% | 75% | Unlined |
|---|---|---|---|---|
| Carbon Tetrachloride | 0.026 | 0.017 | 0.224 | 3.49 |
| Toluene | 0.008 | 0.026 | 0.852 | 2.79 |
| Hexane | 0.006 | 0.054 | 0.020 | 1.00 |

It will be seen from the above table that while effective reduction in permeation was effected at all concentrations of epoxy resin, there was a general increase in permeation as the concentration of epoxy resin was decreased in the coating solution.

Example 6

A coating composition was produced by admixing four parts of epoxy resin A and one part of meta-phenylene diamine. A portion of this composition was modified by addition of three parts of plasticizer (2,3-epoxy-1-propanol). Four ounce Boston round polyethylene bottles were interiorly coated with the unplasticized and plasticized compositions, and the coatings were cured until adherent linings were obtained. Bottles from each group were filled with toluene and hexane and stored at room temperature for eight days with the following results:

WEIGHT LOSS PER DAY (GRAMS)

|  | Non-Plasticized Liner | Plasticized Liner | Unlined Control |
|---|---|---|---|
| Toluene | 0.0014 | 1.599 | 2.79 |
| Hexane | 0.002 | 1.04 | 1.00 |

From these data, it is apparent that while the plasticized liner does reduce permeability, it is not as effective as the unplasticized liner.

Example 7

A coating composition was prepared by admixing four parts of epoxy resin C and one part of hardener E. This mixture was diluted with methyl ethyl ketone to produce a composition containing 70% solids. The interior surfaces of four ounce Boston round polyethylene bottles were coated with this material and the coatings were cured at 140° F. for 12 hours. These bottles were tested for permeability by various organic solvents at 70° F. for the indicated number of days and with the results shown in the following table:

WEIGHT LOSS PER DAY (GRAMS)

|  | Weight of Liner | 27 Days | 56 Days | Unlined Control |
|---|---|---|---|---|
| Toluene | 1.380 | 0.014 | 0.0144 | 2.79 |
| Hexane | 1.246 | 0.0098 | 0.0109 | 1.00 |
| Acetone | 1.234 | 0.0036 | 0.0144 | 0.039 |
| Ethyl Acetate | 1.419 | 0.0020 | 0.0013 | 0.095 |
| Carbon Tetrachloride | 1.490 | 0.0050 | 0.0151 | 3.49 |

Example 8

In order to determine the effect of a hardener upon the permeability of the cured epoxy resin coating, epoxy resin C and hardener E were admixed in ratios of 4:1, 6:1 and 8:1 and in each case the mixture was thinned with methyl ethyl ketone to obtain a solids concentration of 75%. Four ounce Boston round polyethylene bottles were interiorly coated with each composition. Curing times were varied as indicated in the table below:

| Epoxy and hardener ratio | 4–1 | 6–1 | 8–1 |
|---|---|---|---|
| Curing temperature time | 140° F.—60 hrs. | 160° F.—12 hrs. | 160° F.—12 hrs. |
| Length of Test—70° F | 65 days | 54 days | 65 days |
| Weight loss—Grams per day: |  |  |  |
| Toluene | 0.0024 | 0.0148 | 0.0058 |
| Acetone | 0.0059 | 0.0308 | 0.0302 |
| Ethyl Acetate | 0.0027 | 0.0012 | 0.0598 |
| Carbon Tetrachloride | 0.0043 | 0.0164 | 0.0162 |

These results indicate that, in general, permeability increases as the amount of hardener is decreased.

Example 9

A coating composition was produced by admixing nine parts of epoxy resin B, three parts of hardener E and twenty-one parts of urea-formaldehyde resin.[1] This ---
[1] An alcoholic type urea-formaldehyde resin in an intermediate stage of condensation in a 60% solution of xylol-butanol (1:1.5).

mixture was thinned with methyl ethyl ketone to a concentration of 80% solids and the interior surfaces of polyethylene bottles were coated. The coating was cured for twelve hours at 160° F. When these bottles were filled with benzene and tested for permeability at room temperature for a period of twelve days, an average loss per day of 0.004 grams was obtained. The cured liner was flexible and adapted for use in squeeze bottle-type containers.

*Example 10*

A coating mixture was prepared by admixing six parts of epoxy resin B and one part of a hardener which is the product of the reaction of 2 moles of acrylonitrile and 1 mole of diethylenetriamine. This mixture was diluted with methyl ethyl ketone to a solids concentration of 70%. This composition was kept at room temperature for twenty-four hours and interior surfaces of polyethylene bottles were then coated. The coatings were cured at 160° F. for one hour. The weight of the liners obtained ranged between 0.604 and 0.658 grams. The liners were tested for permeability at room temperature for twenty-six days with carbon tetrachloride, toluene and ethyl acetate with the following results:

| | Weight loss per day (grams) |
|---|---|
| Carbon tetrachloride | 0.0067 |
| Toluene | 0.0024 |
| Ethyl acetate | 0.0098 |

The results of this example indicate that the epoxy coating compositions are characterized both by long pot life and desirably short high temperature curing times.

*Example 11*

A coating composition was prepared by admixing 4.6 parts of epoxy resin B, 2.7 parts of a polyamide [2] and 1.0 part of hardener E. This mixture was thinned with methyl ethyl ketone to a solids content of 90% and the interior surfaces of polyethylene bottles were coated. Coatings were cured at 190° F. for one hour. A flexible liner of reduced permeability was obtained.

*Example 12*

Eight parts of epoxy resin C and one part of hardener E were admixed and the resinous mixture was thinned with varying amounts of toluene to obtain various liner weights in the cured product. The interior surfaces of four ounce, Boston round polyethylene bottles were coated with these mixtures and the coatings were initially cured for 16 to 18 hours at 120° F. The temperature was then raised to 190° F. for an additional 90 minutes. Permeability tests were made and the results are noted below:

GRAMS PER DAY WEIGHT LOSSES OF LINED BOTTLES AT 70° F.

| | Control | Liner Weights—Grams | | |
|---|---|---|---|---|
| | | 0.831–0.874 | 0.502–0.594 | 0.172–0.195 |
| Toluene | 2.79 | 0.87 | 1.31 | 2.68 |
| Hexane | 1.00 | 0.086 | 0.085 | 0.22 |
| Carbon tetrachloride | 3.49 | 0.037 | 0.104 | 0.026 |

*Example 13*

A coating composition was prepared from four parts of epoxy resin C, one part of hardener E and one part of styrene oxide. The mixture was thinned with methyl ethyl ketone to a solids concentration of 70%. The interior surface of four ounce, Boston round polyethylene bottles were coated and the coatings were cured from two to seventeen hours at 160° F. A reduction in permeation of toluene and carbon tetrachloride was obtained. Moreover, the addition of the styrene oxide increased the flexibility of the cured liners.

[2] The reaction product of polymeric fat acids containing at least 2 carboxyl groups and diethylene triamine.

*Example 14*

Strips of polystyrene were dipped in the coating composition of Example 13 and allowed to dry and cure at room temperature overnight. The strips could be flexed without cracking the coating. The strips were immersed in ethyl acetate, acetone, carbon tetrachloride and toluene without visible effect on either the coating or the polystyrene. Uncoated polystyrene strips dissolve in the solvents employed.

*Example 15*

Two ounce polymethylene (Koppers' 6200 Super Dylan) bottles were blown and were lined as in Example 1. The bottles were filled with a perfume containing 96 parts of 95% 39C. alcohol and 4 parts of an essential oil (Dodge & Olcott—40-R-5291). The filled bottles were then fitted with aerosol caps and Freon (Du Pont F114 and F12 80/20) was introduced through the cap valve until a gauge pressure of 25 p. s. i. was obtained. The filled bottles were stored at 73° F. and 50% relative humidity for 30 days. An average daily weight loss of only .0014 gram was observed.

*Example 16*

A bottle lining solution was prepared by mixing 10 parts of epoxy resin B, 1 part of epoxy resin D and 1.1 parts of hardener E. The mixture was dissolved in methyl ethyl ketone and additional solvent was added until 35% by weight of the mixture was methyl ethyl ketone. Polyethylene bottles were lined and the linings were cured at 160° F. for one hour. Several bottles were filled with each of n-hexane, ethyl acetate, carbon tetrachloride and toluene. Weight losses per day during storage at 73° C. were as follows:

| | Grams |
|---|---|
| n-Hexane | 0.011 |
| Ethyl acetate | 0.003 |
| Carbon tetrachloride | 0.020 |
| Toluene | 0.008 |

From the foregoing examples, it is apparent that the coating of the surface or the lining of a container or bottle with a cured epoxy resin will result in greatly decreased permeation of the article or container by many of the commercially employed fluids. Moreover, the coated surfaces of the invention are additionally beneficial in preventing passage of gases, such as oxygen, through the plastic substrate. Consequently, synthetic resin, and particularly polyethylene, containers and bottles may be satisfactorily employed as containers for such materials or compositions containing these materials when the containers are lined with a cured epoxy resin in accordance with the present invention.

It is beneficial to irradiate the lining or coating solution during the curing procedure. Not only does irradiation accelerate the normal cross-linking reaction but often effects a graft polymerization whereby the epoxy and/or hardening agent is chemically combined with the substrate, thus greatly enhancing the adherence of the coating or lining to the substrate.

Although in the examples particular emphasis has been placed on the popular polyethylene bottle and, to a lesser extent, polystyrene containers or articles, it is intended that this invention also broadly include the application of a coating or lining of a cured epoxy resin to surfaces of other synthetic resinous articles which are permeable to organic fluids such as carbon tetrachloride, hexane, acetone, benzene, toluene, and the like. The invention is broadly applicable to plastic articles or containers fabricated from all types of thermo-plastic or thermo-setting resins. More specifically, the invention is applicable to articles or containers fabricated from such materials as polyethylene, including conventional polyethylene and the so-called new type low temperature polyethylene, such as Ziegler polyethylene, polymethylene or polyethylene substantially free of branched chains, polyethylene terephthalate, polytetrafluorethylene, nylon, acetate copolymers, ethylene-polyvinyl acetate copolymers, coumarone resins; indene resins; acetylene polymers, including their halogenated derivatives; polymers of olefin hydrocarbons other than ethylene, including polymers of isoprene, butadiene and their homologues, and halogen-substituted derivatives thereof; olefin-sulfur dioxide resins; phenol-aldehyde resins; aldehyde resins; furfural resins; ketone resins; urea-formaldehyde type resins; including thiourea-formaldehyde, melamine formaldehyde, and dicyandiamide-formaldehyde resins; amine-aldehyde resins; sulfonamide-aldehyde resins; nitro resins; resins from such nitrogen-containing materials as hydrazine and related substances, pyrazoles, pyridine, quinoline, pyrrole, indole and carbazole; condensation polyester resins, including resins obtained from polyhydric alcohols and polybasic acids, and from hydroxy acids; polyamide resins and derivatives thereof; mixed polyester-polyamide resins; polyether resins; polyvinyl ethers; polyvinyl alcohols; polyvinyl esters; rubber and its derivatives; cellulose esters and cellulose ethers. All of these plastic materials may be used with any of the usual modifying agents including plasticizers, pigments, fillers, dyes and materials which combine chemically with the polymer ingredients either during formation of the polymer or during an after treatment. Thus, surfaces and containers fabricated from copolymers, interpolymers and mixtures of polymers may be advantageously rendered less permeable to organic fluids by application of a coating or lining of a cured epoxy resin.

As indicated, containers or bottles may, in accordance with the invention, be coated or lined on either the interior or exterior surfaces or both. Where the problem involved is merely the prevention of moisture from entering the product to be packaged or to prevent gases from the atmosphere from contacting the contents of the container, an external impermeable coating is satisfactory. However, from the standpoint of the permeation of a liquid within a container outwardly through the container walls, it is greatly preferred to employ an interior lining or coating. Moreover, with an external coating, an ingredient of the fluid content may be essential, although quantitatively small, and consequently such ingredient may be lost by absorption in the container wall even though the ingredient does not escape from the bottle itself. This latter situation is especially important where the containers are employed for skin lotions, perfumes, and the like, in which the essential oil fraction governing the perfume odor is relatively small. Accordingly, despite the proportionally greater difficulty of applying a lining to the container's interior, the advantages of such an inner lining are such that it is preferred. In some instances it may be desirable to apply both an interior and exterior lining.

The mechanical method of applying the coating or lining to the container surfaces are well known to the art and do not constitute a part of the present invention. Specific details of the operation and functioning of spray coating units may be found in Paasche Patents 2,547,884, 2,059,706 and 2,069,844.

Since modifications of the disclosed invention will be apparent to those skilled in the art, it is intended that the invention be limited only by the scope of the appended claims.

We claim:

1. A synthetic resin article having a surface characterized by enhanced resistance to permeation by organic fluids, said surface having an adherent coating of a cured epoxy resin.

2. A synthetic resin article having a surface characterized by enhanced resistance to permeation by organic fluids, said surface having an adherent coating of the cured reaction product of a polyfunctional halohydrin and a polyhydric phenol.

3. A synthetic resin article having a surface characterized by enhanced resistance to permeation by organic fluids, said surface having an adherent coating of the reaction product of a polyfunctional halohydrin-polyhydric phenol condensate and a polyamine.

4. A synthetic resin article having a surface characterized by enhanced resistance to permeation by organic fluids, said surface having an adherent coating of the reaction product of a polyfunctional halohydrin-polyhydric phenol condensate and a polyamide.

5. A synthetic resin article having a surface characterized by enhanced resistance to permeation by organic fluids, said surface having an adherent coating of the reaction product of an epichlorhydrin bis-phenol condensate and a polyamine.

6. A synthetic resin article having a surface characterized by enhanced resistance to permeation by organic fluids, said surface having an adherent coating of the reaction product of an epichlorhydrin bis-phenol condensate and a polyamide.

7. A polyethylene container having a surface characterized by enhanced resistance to permeation by organic fluids, said surface having an adherent coating of a cured epoxy resin.

8. A polyethylene container having a surface characterized by enhanced resistance to permeation by organic fluids, said surface having an adherent coating of the cured reaction product of a polyfunctional halohydrin and a polyhydric phenol.

9. A polyethylene container having a surface characterized by enhanced resistance to permeation by organic fluids, said surface having an adherent coating of the reaction product of a polyfunctional halohydrin-polyhydric phenol condensate and a polyamine.

10. A polyethylene container having a surface characterized by enhanced resistance to permeation by organic fluids, said surface having an adherent coating of the reaction product of a polyfunctional halohydrin-polyhydric phenol condensate and a polyamide.

11. A polyethylene container having a surface characterized by enhanced resistance to permeation by organic fluids, said surface having an adherent coating of the reaction product of an epichlorhydrin bis-phenol condensate and a polyamine.

12. A polyethylene container having a surface characterized by enhanced resistance to permeation by organic fluids, said surface having an adherent coating of the reaction product of an epichlorhydrin bis-phenol condensate and a polyamide.

13. A polyethylene bottle of increased resistance to permeation by organic fluids, at least one surface thereof being pretreated to promote adhesion of polar compounds having a strongly adherent coating comprising a cured epoxy resin.

14. A polyethylene bottle of increased resistance to permeation by organic fluids, at least one surface thereof being hydrophilic and having a strongly adherent coating comprising the cured reaction product of a polyfunctional halohydrin and a polyhydric phenol.

15. A polyethylene bottle of increased resistance to permeation by organic fluids, at least one surface thereof being oxidized and having a strongly adherent coating comprising the reaction product of a polyfunctional halohydrin-polyhydric phenol condensate and a polyamine.

References Cited in the file of this patent

UNITED STATES PATENTS

| | | |
|---|---|---|
| 739,514 | Street | Sept. 22, 1903 |
| 2,091,723 | Sterino | Aug. 31, 1937 |
| 2,324,483 | Castan | July 20, 1943 |
| 2,491,947 | Bardash | Dec. 20, 1949 |
| 2,622,598 | Rosenblum | Dec. 23, 1952 |